United States Patent [19]

Cane

[11] Patent Number: 4,735,660
[45] Date of Patent: Apr. 5, 1988

[54] CROSS-LINKED GEL MODELING COMPOSITION

[75] Inventor: Albert Cane, Hawthorne, Calif.

[73] Assignee: Mattel, Inc., Hawthorne, Calif.

[21] Appl. No.: 67,520

[22] Filed: Jun. 26, 1987

[51] Int. Cl.$^4$ ............................ C08L 1/00; C08L 5/00
[52] U.S. Cl. .................................. 106/203; 106/163.1; 106/208; 106/209
[58] Field of Search ..................... 106/163.1, 209, 208, 106/203

[56] References Cited

U.S. PATENT DOCUMENTS

| | | | |
|---|---|---|---|
| 2,541,851 | 3/1951 | Wright | 524/701 |
| 3,072,509 | 1/1963 | Barnhart et al. | 149/60 |
| 3,565,815 | 2/1971 | Christy | 252/301.3 |
| 3,617,407 | 11/1971 | Craig et al. | 149/60 |
| 3,634,280 | 1/1972 | Dean et al. | 252/301.3 |
| 3,661,790 | 5/1972 | Dean et al. | 252/301.3 |
| 3,804,654 | 4/1974 | Liv | 106/209 |
| 3,873,485 | 3/1975 | Fichera | 106/272 |
| 4,172,054 | 10/1979 | Ogawa et al. | 524/18 |
| 4,333,461 | 6/1982 | Muller | 128/284 |
| 4,439,328 | 3/1984 | Moity | 252/8.5 LC |
| 4,568,481 | 2/1986 | Harris, Jr. | 252/315.3 |
| 4,618,491 | 11/1986 | Kanematu et al. | 424/81 |
| 4,624,976 | 11/1986 | Amano et al. | 524/13 |
| 4,637,849 | 1/1987 | Harris | 149/60 |

*Primary Examiner*—Theodore Morris
*Attorney, Agent, or Firm*—Ronald M. Goldman; Melvin A. Klein; Daniel F. Sullivan

[57] ABSTRACT

A cross-linked gel modeling composition of various colors that is cohesively strong but pliable and ductile which results from the addition of wood flour to a waterbased gel using cross-linkable guar gum as a gellant.

11 Claims, No Drawings

CROSS-LINKED GEL MODELING COMPOSITION

BACKGROUND OF THE INVENTION

1. Field of the Invention

The field of art to which this invention pertains is a cross-linked gel modeling composition that is cohesively strong but pliable and ductile and in particular results from the addition of wood flour to a water based gel using cross-linkable guar gum or polygalactomannan as the gellant.

2. Description of the Prior Art

The following is a list of patents which have issued in this area:

U.S. Pat. No. 2,541,851 to Wright relates to a process for making putty-like elastic composition comprising a dimethyl silicone.

U.S. Pat. No. 3,565,815 to Christy relates to a moldable plastic product comprising polystyrene or copolymers of polystyrene. The invention relates to a useful amusement product for polystyrene which can be molded, shaped and has adhesive properties and can be made to glow in the dark.

U.S. Pat. No. 3,634,280 and U.S. Pat. No. 3,661,790 to Dean et al, relate to a non-toxic composition comprising various components including a bounding putty possessing unusual properties, particularly the ability to glow in the dark after exposure to a light source.

U.S. Pat. No. 3,873,485 to Fichera relates to a moldable aqueous plastic mass of polyethylene oxide, fumed silica and polyglycol.

U.S. Pat. No. 4,333,461 to Muller relates to borated polysaccharide absorbents and absorbent products.

U.S. Pat. No. 4,439,328 to Moity relates to a well servicing fluid additive and discloses a fluid, pourable well servicing fluid additive comprising a water-soluble polymer, an alkaline earth metal base, and a fibrous material suspended in an oleaginous liquid with a gellant and, optionally, a dispersant therefor.

U.S. Pat. No. 4,568,481 to Harris, Jr. relates to extension of gelation time of crosslinked polygalactomannans.

U.S. Pat. No. 4,618,491 to Kanematu et al relates to stable gel composition containing a carboxymethyl cellulose salt and a process for the preparation of them.

U.S. Pat. No. 4,624,976 to Amano et al relates to modeling material composition comprising a synthetic resin, a wooden powder, and an oil.

U.S. Pat. No. 4,637,849 to Harris, Jr. relates to waterproof ammonium nitrate fuel oil explosives.

SUMMARY OF THE INVENTION

This invention is directed to a cross-linked gel modeling composition that is cohesively strong but pliable and ductile which results from addition of wood flour to a water-based gel using cross-linkable guar gum or polygalactomannan as the gellant. In one aspect this invention pertains to a composition which can be molded, sculpted, or kneaded with the bare hands without stickiness or other unpleasant skin sensations. In another aspect of the invention a composition can be given any desired fragrance. However, with the use of a coniferous wood flour in the composition, a natural pleasant fresh-cut wood odor results. In another aspect of the invention, upon drying to equilibrium under ordinary temperatures and humidity, a surprisingly strong wood-like structure is formed. Thus the composition can be treated as if it were wood enabling sawing, drilling, and carving to be performed very much easier than with ordinary wood.

In preparing the modeling compositions of this invention, preservative(s), wood flour, self cross-linking guar gum, and acidic component of a buffer system are agitated with most of the water to be used.

After mixing time to assure hydration of the guar gum, the alkaline component of the buffer system which is dissolved in the remaining water, is added, and agitation is continued until cross-linking is completed. A colorant, if specified, can be added at any time.

DESCRIPTION OF THE PREFERRED EMBODIMENT

Preservatives useful in the cross-linked gel modeling composition of this invention include imidazolidinyl urea, diazolidinyl urea, 1.3bis(hydroxymethyl)-5,5-dimethylhydantoin manufactured under the tradename DANTOGUARD by Lonza Corp., zinc borate, 1-(3chloroallyl)-3,5,7triaza-1-azoniaadamantane chloride, manufactured under the tradename DOWICIL 200 by Dow Chemical CO., methyl p-hydroxybenzoate, propyl p-hydroxybenzoate, and edetic acid, and its salts, and mixtures thereof.

Wood flour according to this invention can range from unscreened sawdust to a particular particle size such as 100 mesh wood flour. The wood flour ranges from about 4% to about 25% by weight of the composition, and preferably is about 13% by weight.

In the instant invention guar gum or polygalactomannan ranges from about 1% to about 10% by weight of the composition, and preferably is about 4% by weight. The cross-linking agent which is used in the guar gum is of the boron oxide type, such as, boric acid, sodium borate or mixtures thereof.

The mixing procedure comprises two steps. The initial step is hydration of the guar gum at an acidic pH. The second step is requiring a neutral to alkaline pH. The two components of a buffer system can serve each of these conditions. Any suitable buffer systems can be used including, phosphates, citrates, bicarbonates, malates, glutarates, and mixtures thereof.

EXAMPLE 1

| Ingredients: | Weight % |
| --- | --- |
| Diazolidinyl urea | 0.2 |
| Methyl p-hydroxybenzoate | 0.2 |
| Propyl p-hydroxybenzoate | 0.1 |
| Soduim phosphate, monobasic | 1.2 |
| Douglas fir wood flour, 40 mesh | 12.1 |
| Self cross-linking guar gum | 3.9 |
| Water | 80.2 |
| Sodium phosphate, dibasic | 2.1 |

All of the ingredients, except the sodium phosphate, dibasic and 20% of the total water, are placed in the mixing vessel and agitated until complete hydration of the guar gum has occured. Depending on agitator efficiency, this should require about 5-15 minutes.

The sodium phosphate, dibasic is previously dissolved in the withheld water and is now added. Stirring continues for an additional 5-10 minutes or until it is obvious cross-linking has occurred.

EXAMPLE 2

| INGREDIENTS: | WEIGHT % |
| --- | --- |
| Zinc borate | 0.33 |
| DOWICIL 200 | 0.15 |
| Methyl p-hydroxybenzoate | 0.10 |
| Propyl p-hydroxybenzoate | 0.03 |
| Edetic acid | 0.20 |
| Sodium phosphate, monobasic | 1.18 |
| Wood flour, 100 mesh, white pine | 13.16 |
| Guar gum, self-cross-linking | 3.95 |
| Deionized water | 78.93 |
| Sodium phosphate, dibasic | 1.97 |

For mixing instructions, see procedure of Example 1.

EXAMPLE 3

| Ingredients: | Weight % |
| --- | --- |
| 1,3bis(hydroxymethyl)-5,5-dimethylhydantoin | 0.5 |
| Zinc borate | 0.5 |
| Malic acid | 1.0 |
| Hardwood flour, 60 mesh | 15.0 |
| Self-cross linking guar gum | 4.0 |
| Deionized water | 75.8 |
| Colorant pigment | 1.0 |
| Sodium malate | 2.2 |

For mixing instructions, see procedure of Example 1.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A cross-linked gel modeling composition which is cohesively strong yet ductile and pliable comprising water, a buffer system to control the pH range for hydration and cross-linking polygalactomannan, a cross-linking agent for polygalactomannan and wood flour, wherein the polygalactomannan and cross-linking agent are present in the amount ranging from about 1% to about 10% and wood flour is present in the amount ranging from about 5% to about 25%, and water is present in a major amount, said percentages being based on the total weight of the composition.

2. The composition according to claim 1 wherein the pH buffer system includes monobasic sodium phosphate and dibasic sodium phosphate.

3. The composition according to claim 1 wherein the cross-linking agent is of the boron oxide type.

4. The composition according to claim 1 wherein the wood flour particle size ranges from 40 to 200 mesh.

5. The composition according to claim 4 wherein the wood flour is white pine.

6. The composition according to claim 1 including at least one preservative which includes zinc borate, methyl p-hydroxybenzoate, prophyl p-hydroxybenzoate, edetic acid, and mixtures thereof.

7. A composition according to claim 1 wherein the polygalactomannan and cross-linking agent are about 4% by weight of the composition.

8. A composition according to claim 1 wherein the wood flour is about 13% by weight of the composition.

9. A process for making a cohesively strong yet ductile and pliable modeling composition comprising the steps of mixing a buffer component on the acid side, water, wood flour, guar gum, and a cross-linking agent for the guar gum of the boron oxide type until complete hydration of the guar gum occurs, and then combining with additional water which is premixed with a buffer component on the basic side until cross-linking of the guar gum occurs.

10. A process according to claim 9 including the step of adding a preservative.

11. A process according to claim 9 including the step of adding a colorant.

* * * * *